(12) United States Patent
Iatsun et al.

(10) Patent No.: US 11,055,506 B2
(45) Date of Patent: Jul. 6, 2021

(54) METHOD OF ANALYZING A FINGERPRINT (71) Applicant: IDEMIA IDENTITY & SECURITY FRANCE, Courbevoie (FR)

(72) Inventors: Iana Iatsun, Courbevoie (FR); Laurent Kazdaghli, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 25 days.

(21) Appl. No.: 16/537,068

(22) Filed: Aug. 9, 2019

(65) Prior Publication Data
US 2020/0050820 A1 Feb. 13, 2020

(30) Foreign Application Priority Data
Aug. 10, 2018 (FR) ...................................... 1857460

(51) Int. Cl.
*G06K 9/00* (2006.01)
(52) U.S. Cl.
CPC ....... *G06K 9/00026* (2013.01); *G06K 9/0008* (2013.01); *G06K 9/00067* (2013.01)
(58) Field of Classification Search
None
See application file for complete search history.

(56) References Cited

U.S. PATENT DOCUMENTS

| 5,799,098 A | 8/1998 | Ort et al. | |
|---|---|---|---|
| 2003/0169910 A1* | 9/2003 | Reisman | G06K 9/00087 382/124 |
| 2007/0297655 A1* | 12/2007 | Monden | G06K 9/00067 382/125 |

FOREIGN PATENT DOCUMENTS

FR 2865057 A1 7/2005

* cited by examiner

*Primary Examiner* — Joseph R Haley
(74) *Attorney, Agent, or Firm* — Muncy, Geissler, Olds & Lowe, P.C.

(57) ABSTRACT

A method of analyzing a fingerprint, the method comprising the step of acquiring a fingerprint image (20) together with the following steps:
performing filtering processing on the fingerprint image to estimate, for each pixel of the fingerprint image, a first frequency of the ridges (21) in the fingerprint, and using the first frequencies associated with the pixels of the fingerprint image to produce a first frequency map (22) of the fingerprint image;
subdividing the fingerprint image into a plurality of windows each comprising a plurality of pixels, calculating a Fourier transform for each window in order to estimate a second frequency of the ridges for all of the pixels in said window, and using the second frequencies associated with the pixels of the windows to produce a second frequency map of the fingerprint image; and
merging the first frequency map and the second frequency map in order to obtain a map of consolidated frequencies of the fingerprint image.

9 Claims, 8 Drawing Sheets

METHOD OF ANALYZING A FINGERPRINT

The invention relates to the field of methods of analyzing fingerprints.

BACKGROUND OF THE INVENTION

Biometric recognition means are being used more and more frequently for protecting access to secure zones: businesses, banks, airports, prisons, etc.

In particular, it is possible to identify and authenticate a person from that person's fingerprints, which are unique. The term "fingerprint" is used generically herein to cover any papillary print, i.e. prints of fingers proper, of thumbs, of palms, of toes, . . . .

A fingerprint image, representative of a fingerprint and as acquired by a sensor, e.g. an optical, thermal, or ultrasound sensor, may be seen as alternating ridges and valleys.

A fingerprint image also includes a certain number of characteristic points or "minutiae", e.g. corresponding to the end of a ridge or to a ridge splitting into two (bifurcation). In order to compare two fingerprint images, and thus two sets of minutiae, in a manner that is effective and reliable, it is appropriate beforehand to estimate accurately the local frequency of the ridges. Specifically, a poor estimate of the local frequency of the ridges can lead to ridges being duplicated. The false ridges then produce non-existent minutiae that tend to falsify identification and authentication.

Unfortunately, it can sometimes be difficult to evaluate the local frequency of ridges accurately. In general manner, the main obstacle for evaluating the local frequency of the ridges accurately is poor quality of fingerprint images. The degraded structure of a fingerprint image makes it more complicated to analyze the resulting data. Estimating the local frequency can become impossible in the presence of noise in the fingerprint image, or indeed in the presence of a scar.

Other phenomena can degrade the accuracy with which local frequency of the ridges is estimated: the presence of pores, frequent changes in the direction of the ridges, a large difference in the distances between ridges from one person to another, significant variation in the local frequency within a single fingerprint, period difference of ridges and valleys, noise, etc.

Figure 1:
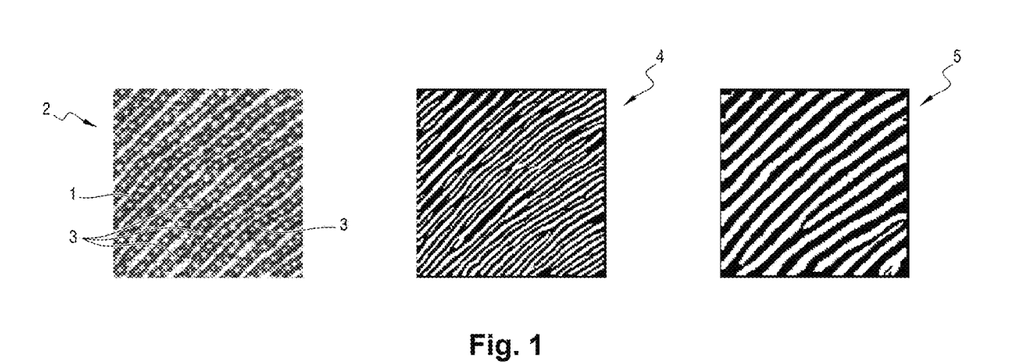
FIG. 1 shows a fingerprint image, a processed image, and an expected image.

Thus, with reference to FIG. 1, on the ridges 1 of a fingerprint image 2 there can be seen dilated pores 3 of the skin that are wide open because of high temperature. On the processed image 4, obtained from the fingerprint image 2 by a first known analysis method, it can be seen that some of the ridges are duplicated because of the poor estimate of the local frequency of the ridges. This processed image 4 may be compared with an expected image 5 that has been processed effectively, and that does not present duplication of ridges. It can clearly be seen that compared with the expected image 5, the processed image 4 is significantly degraded.

Figure 2:
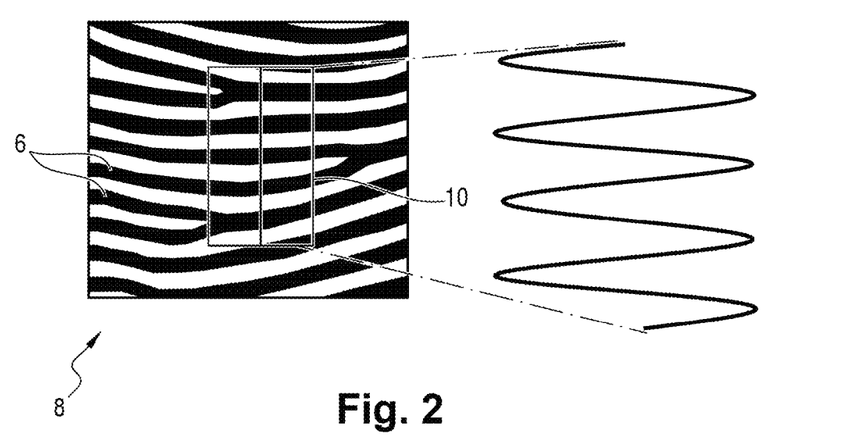
FIG. 2 shows a fingerprint image and a moving window.
Figure 3:
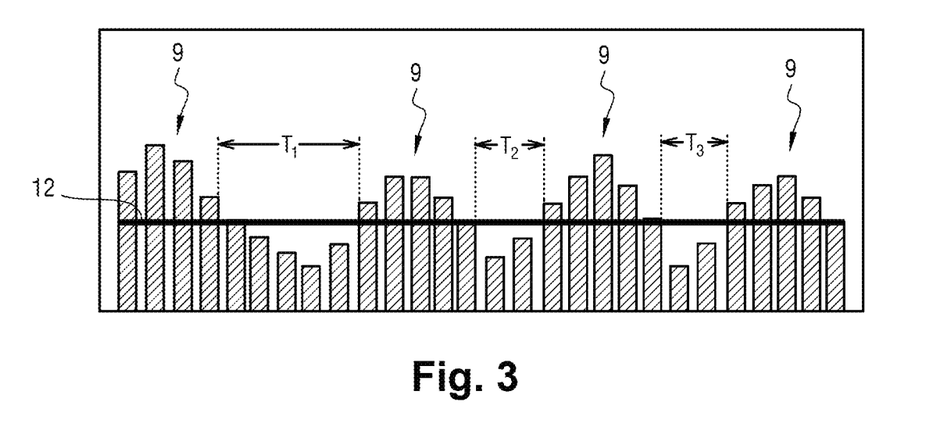
FIG. 3 is a graph showing gray levels associated with FIG. 2.

In order to estimate accurately the local frequency of ridges, proposals have been made to perform a second known analysis method, described below with reference to FIGS. 2 to 3.

The local frequency of the ridges 6 in a sample of a fingerprint image 8 is defined as being equal to the number of ridges 6 divided by the length of the sample along an axis orthogonal to the local orientation axis of the ridges 6. The local frequency is different between two fingerprints, and it may also vary within a single fingerprint.

The second known method of analyzing local frequency makes use of information about the number of pixels between two gray level peaks 9.

These gray levels are determined in two main steps making use of moving windows 10. Firstly, the local orientation of the ridges 6 is estimated in each moving window 10. It is calculated as being equal to the ratio between the intensity gradient responses obtained by a Sobel filter in the vertical direction and in the horizontal direction. Therefore, a moving window 10, oriented in the overall direction in which the ridges 6 are oriented, is placed around each pixel. For each column of the moving window 10, pixel values are accumulated. Thus, the distance between two peaks 9 represents the distance between the ridges 6.

The distances between three successive peaks 9 are written $T_1$, $T_2$, and $T_3$. These distances correspond to intervals over which the gray levels are below a predetermined threshold 12.

The local frequency is estimated by using the following formula:

$$f = \frac{1}{T_1 + T_2 + T_3}$$

The weak point of this method is that the local frequency is determined with little accuracy when the fingerprint image is out of focus or of poor quality.

OBJECT OF THE INVENTION

An object of the invention is to improve the estimate of the frequency of ridges in a fingerprint image representing a fingerprint.

SUMMARY OF THE INVENTION

In order to achieve this object, there is provided an analysis method for analyzing a fingerprint, the method comprising the steps of using at least one sensor to acquire a fingerprint image representative of the fingerprint, together with the following steps performed by at least one electrical processor unit;

performing filtering processing on the fingerprint image to estimate, for each pixel of the fingerprint image, a first frequency of the ridges in the fingerprint, and using the first frequencies associated with the pixels of the fingerprint image to produce a first frequency map of the fingerprint image;

subdividing the fingerprint image into a plurality of windows, each comprising a plurality of pixels, calculating a Fourier transform for each window in order to estimate a second frequency of the ridges for all of the pixels in said window, and using the second frequencies associated with the pixels of the windows to produce a second frequency map of the fingerprint image; and merging the first frequency map and the second frequency map in order to obtain a map of consolidated frequencies of the fingerprint image.

Performing both filtering processing and also analysis of the spectrum of the Fourier transform, followed by merging the first frequency map with the second frequency map makes it possible to estimate the frequencies of ridges in the fingerprint image very accurately.

The invention also proposes a system comprising at least one sensor and at least one electrical processor unit, the system performing an analysis method as defined above.

The invention can be better understood in the light of the following description of a particular non-limiting implementation of the invention.

BRIEF DESCRIPTION OF THE DRAWINGS

Reference is made to the accompanying drawings, in which.

DETAILED DESCRIPTION OF THE INVENTION

Figure 4:
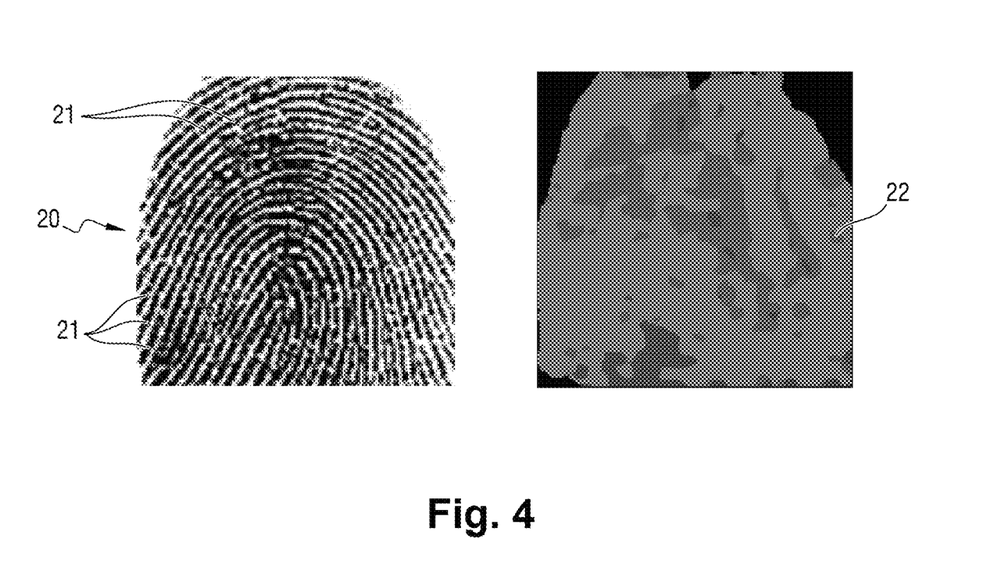
FIG. 4 shows a fingerprint image and a map of first frequencies.

With reference to FIG. 4, the analysis method of the invention consists initially in acquiring a fingerprint image 20 representative of an individual's fingerprint. In this example the fingerprint is literately the print of a finger, however it could be some other papillary print, e.g. a palm print.

The fingerprint image 20 is acquired using a sensor, e.g. an optical sensor, a thermal sensor, an ultrasound sensor, etc.

Thereafter, the analysis method comprises a certain number of steps all of which are performed by an electrical processor unit. The term "electrical processor unit" is used to mean any type of fixed or mobile electrical equipment that includes one or more processor components (microcontroller, processor, field programmable gate array (FPGA), digital signal processor (DSP), etc.) suitable for executing instructions of a program for performing the tasks that are dedicated thereto (and in particular for performing at least part of the analysis method of the invention). It should be observed that it is possible to perform the steps not in only one, but rather in a plurality of electrical processor units, possibly connected to one another by any type of connection means (wired, wireless, network, etc.). Naturally, the processor unit is capable of acquiring the fingerprint image 20 produced by the sensor.

Filtering processing is applied initially to the fingerprint image 20 in order to estimate, for each pixel of the fingerprint image 20, a first frequency of the ridges 21 in the fingerprint. In this example, filtering processing makes use of a bank of filters. Specifically, the bank of filters is a Gabor filter bank.

The filtering processing is performed by a coder that gives each pixel a first frequency value contained within a finite list of predefined values. In this example, the list has three values.

Thus, using the first frequencies associated with the pixels of the fingerprint image 20, a first frequency map 22 is produced of the fingerprint image 20. In the first frequency map 22, the gray level of each pixel corresponds to the first frequency that is associated therewith (i.e. to one of the three values in the list).

Figure 5:
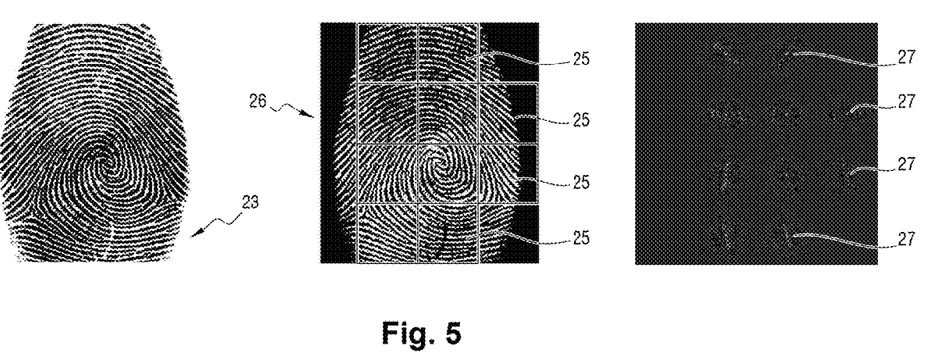
FIG. 5 shows a fingerprint image, fingerprint image windows, and Fourier transform of the windows calculated while performing the analysis method of the invention.

With reference to FIG. 5, the fingerprint image 23 is also subdivided into a plurality of windows 25, each comprising a plurality of pixels. In this example, each window 25 comprises 128×128 pixels. At least two windows 25 overlap; specifically in this example all adjacent windows 25 overlap.

The fingerprint image 23 is also processed by applying a mask so as to eliminate the background. Thus, in the fingerprint image 26, the fingerprint is separated from the background. The following operations are performed solely on the fingerprint and not on the background.

A Fourier transform 27 is applied to each window 25 of the fingerprint image 26.

Figure 6:
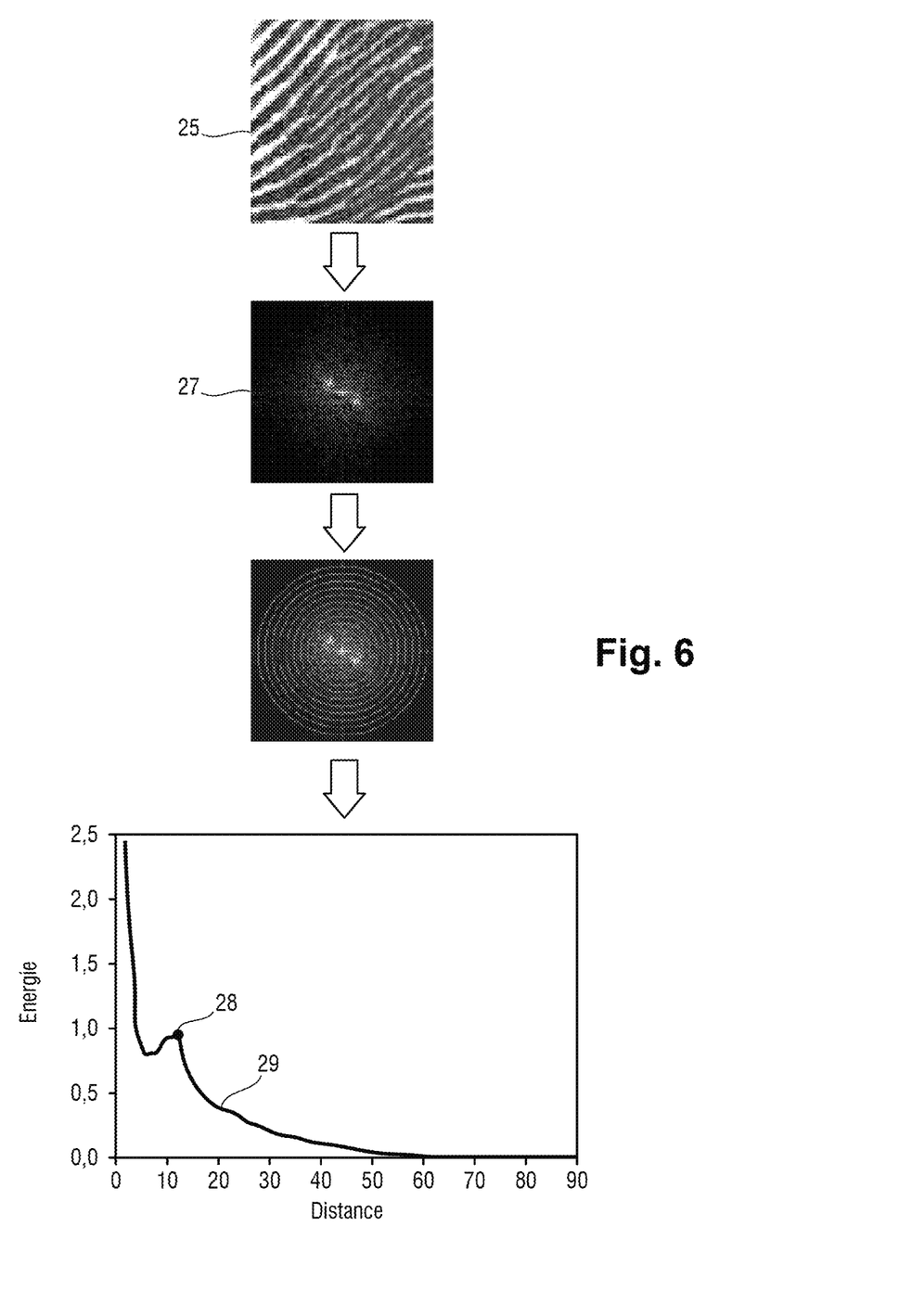
FIG. 6 shows a window, the Fourier transform, the application of a radial distribution function, and a graph plotting a curve of the radial distribution function.

Thereafter, with reference to FIG. 6, for each window 25, the spectrum of the Fourier transform 27 is analyzed. The analysis consists firstly in calculating a radial distribution function of the spectrum of the Fourier transform 27.

For each window 25, this involves identifying the peaks 28 (or "energy peaks") of the curve 29 plotting the radial distribution function. The frequency corresponding to each peak 28 of the window 25 is referred to as a "window frequency". A plurality of window frequencies can thus be associated with a single window 25.

Thereafter, a second frequency of the ridges is associated with each pixel of each window 25 of the fingerprint image. When a single window frequency is associated with a given pixel, the second frequency of the pixel takes the value of the window frequency.

Nevertheless, it is possible for a plurality of window frequencies to be associated with a given pixel. This results in particular from the fact that a plurality of window frequencies may be associated with a given window 25, and also from the fact that the windows 25 overlap, having the consequence that some pixels belong to a plurality of windows 25.

When a plurality of window frequencies are associated with a given pixel, the second frequency of said pixel is estimated by determining a median value for those window frequencies.

The following formula is used:

$$F2 = \text{median}(f_1, f_2, f \ldots, f_n)$$

where $F_2$ is the second frequency associated with a pixel and where $f_1, f_2, f \ldots, f_n$ are the window frequencies associated with said pixel.

Figure 7:
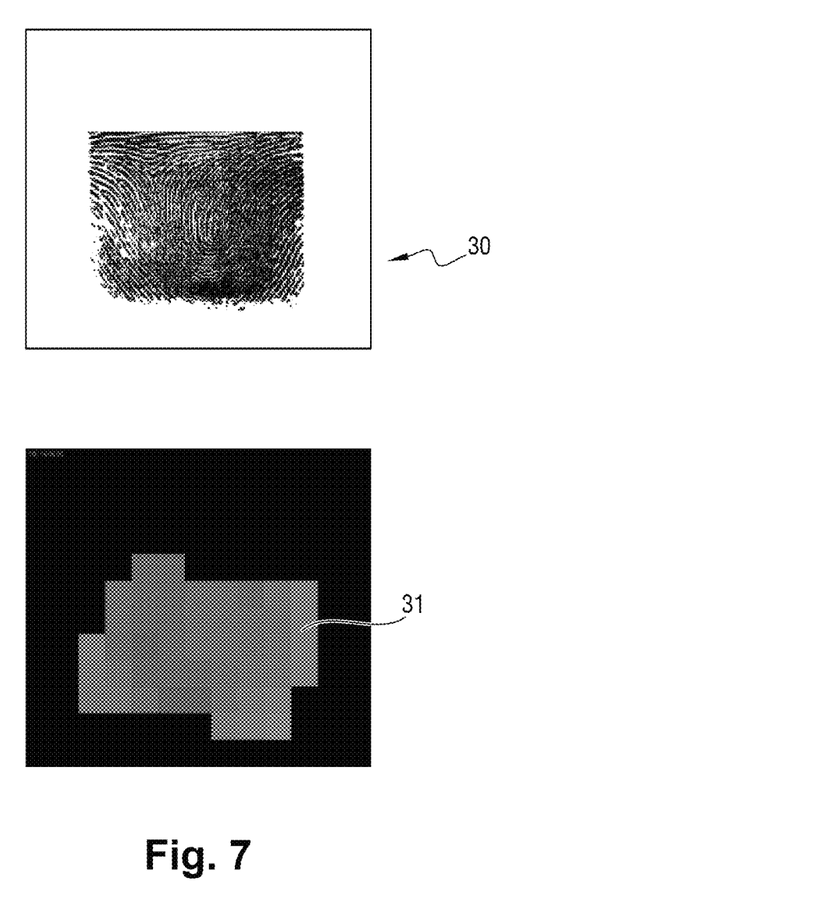
FIG. 7 shows a fingerprint image and a map of second frequencies.

With reference to FIG. 7, the second frequencies associated with the pixels of the windows of the frequency image 30 are used to produce a second frequency map 31. The fingerprint image 30 is of smaller size than the fingerprint image 20. The second frequency map 31 presents the same size as the fingerprint image 30. It can clearly be seen in the second frequency map 31 that the frequency change is uniform. There is no sudden change of frequency, and this does indeed correspond to reality.

Figure 8:
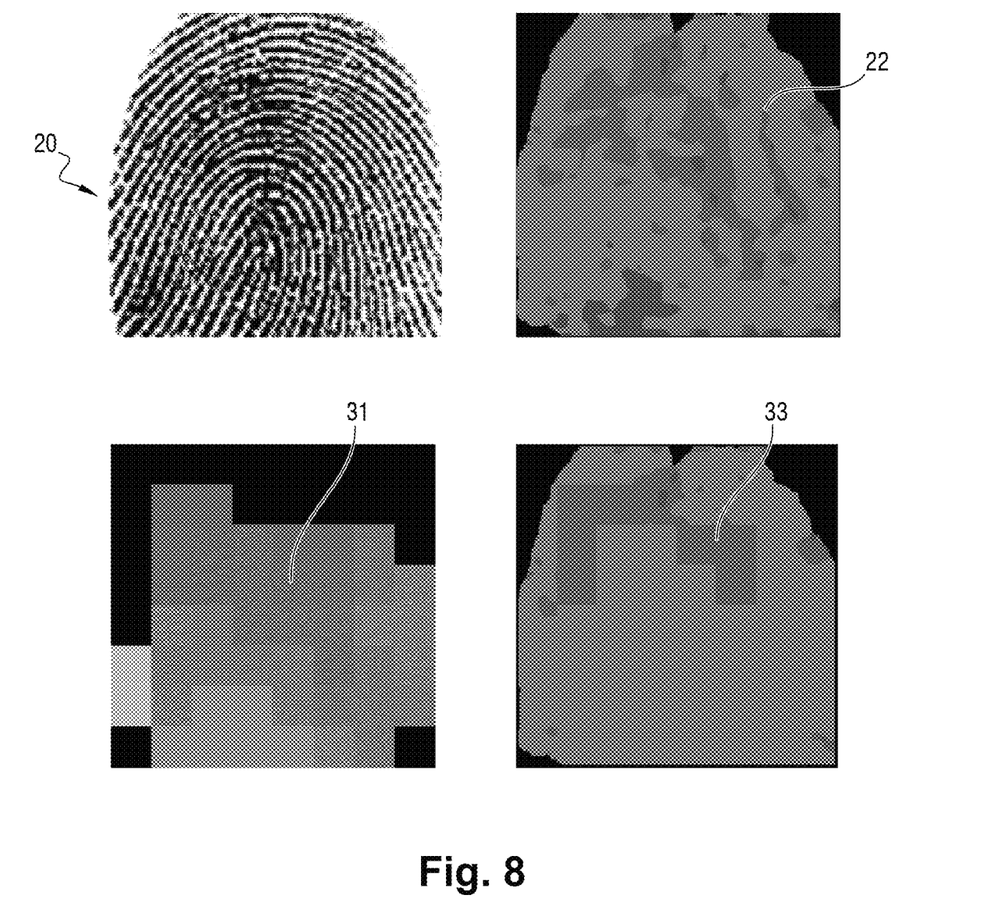
FIG. 8 shows a fingerprint image, a map of first frequencies, a map of second frequencies, and a map of consolidated frequencies.

With reference to FIG. 8, the first frequency map 22 and the second frequency map 31 are merged.

For a given pixel, merging consists in associating said given pixel with an optimized frequency equal to a value from the list of predefined values that is closest to the second frequency. For pixels having no second frequency associated therewith, the optimized frequency is equal to the first frequency.

This produces a map of consolidated frequencies 33 for the fingerprint image 20.

Figure 9:
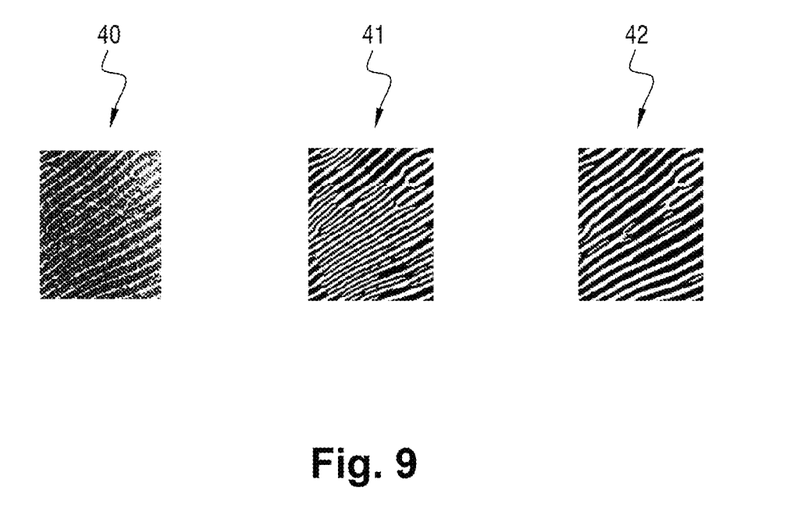
FIG. 9 shows a fingerprint image, a first image processed solely with filtering processing, and a second image processed with the analysis method of the invention.

With reference to FIG. 9, it is possible to compare a fingerprint image 40 acquired by the sensor, a first processed image 41 obtained solely by performing filtering processing, and a second processed image 42 obtained by the analysis method of the invention.

The local frequencies of the ridges in the second processed image 42 are much closer to those of the fingerprint image 40 than are the local frequencies of the ridges in the first processed image 41. The second processed image 42 is more accurate and cleaner. In particular, although the first processed image 41 includes zones 43 in which the ridges are duplicated, that is not true of the second processed image.

Performing filtering processing on its own comprises a method that suffers from numerous weak points. Since the number of filters is limited, once the frequency of ridges is greater than or less than the expected frequency, calculations become erroneous. Ridges can then become duplicated consequently degrading the remainder of the processing. The filters are also sensitive to degradations present in the fingerprint image. The presence of scars can modify their responses. Nevertheless, the computation times required for the filters remain reasonable compared with the spectral approach. It should be observed that the presence of an imperfection in the fingerprint image does not prevent energy peaks from being detected. Thus, two techniques are combined in the analysis method of the invention, thereby serving to obtain an analysis method that is accurate, effective, and with processing times that are short.

The invention is not limited to the particular implementations described above, but on the contrary covers any variant coming within the ambit of the invention as defined by the claims.

It should be observed that it is possible to perform the spectral approach in certain zones only of the fingerprint image. By way of example, those zones may be zones having sudden changes in the frequency of the ridges.

The invention claimed is:

1. An analysis method for analyzing a fingerprint, comprising the step of using at least one sensor to acquire a fingerprint image representative of the fingerprint, together with the following steps performed by at least one electrical processor unit;
performing filtering processing on the fingerprint image to estimate, for each pixel of the fingerprint image, a first frequency of the ridges in the fingerprint, and using the first frequencies associated with the pixels of the fingerprint image to produce a first frequency map of the fingerprint image, the first frequency map being a first frequency image;
subdividing the fingerprint image into a plurality of windows each comprising a plurality of pixels, calculating a Fourier transform for each window in order to estimate a second frequency of the ridges for all of the pixels in said window, and using the second frequencies associated with the pixels of the windows to produce a second frequency map of the fingerprint image; and
merging the first frequency map and the second frequency map in order to obtain a map of consolidated frequencies of the fingerprint image.

2. The analysis method according to claim 1, wherein, for each window, the second frequency of a pixel is estimated by the steps of calculating a radial distribution function of the spectrum of the Fourier transform of the window, of identifying at least one peak of the radial distribution function, and of defining at least one window frequency corresponding to the peak.

3. The analysis method according to claim 2, wherein, when a single window frequency is associated with a given pixel, the second frequency of the pixel takes the value of the window frequency, and when a plurality of window frequencies are associated with a given pixel, the second frequency of said pixel is estimated by determining a median value of those window frequencies.

4. The analysis method according to claim 1, wherein at least two windows overlap.

5. The analysis method according to claim 1, wherein, for each pixel, the value of the first frequency given to said pixel is taken from a finite list of predefined values, and wherein the step of merging the first frequency map and the second frequency map consists, for a given pixel, in associating said given pixel with an optimized frequency equal to the predefined value in the finite list that is closest to the second frequency of the pixel.

6. The analysis method according to claim 1, wherein the filtering processing makes use of a filter bank.

7. The analysis method according to claim 1, wherein the filter bank is a Gabor filter bank.

8. A system comprising at least one sensor and at least one electrical processor unit, the system performing an analysis method according to claim 1.

9. The analysis method according to claim 1, wherein the second frequency map being a second frequency image.

* * * * *